(12) United States Patent
Tang

(10) Patent No.: US 6,221,527 B1
(45) Date of Patent: *Apr. 24, 2001

(54) ELECTRODE FOR AN ELECTROCHEMICAL CELL INCLUDING RIBBONS

(75) Inventor: Nghia Cong Tang, Olmsted Township, OH (US)

(73) Assignee: Eveready Battery Company, Inc., St. Louis, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/203,055

(22) Filed: Dec. 1, 1998

(51) Int. Cl.[7] ............................. H01M 6/04; H01M 4/58; H01M 4/42
(52) U.S. Cl. ....................... 429/218.1; 429/206; 429/229
(58) Field of Search ................. 429/209, 218.1, 429/229

(56) References Cited

U.S. PATENT DOCUMENTS

| | | | |
|---|---|---|---|
| 3,853,625 | 12/1974 | Louzos . | |
| 5,158,722 | * 10/1992 | Ilic et al. | 264/40.1 |
| 5,541,021 | * 7/1996 | Watanabe et al. | 429/206 |
| 5,607,796 | * 3/1997 | Jacus et al. | 429/165 |
| 5,744,263 | * 4/1998 | Inagaki et al. | 429/206 |
| 6,022,639 | * 2/2000 | Urry | 429/229 |

FOREIGN PATENT DOCUMENTS

| | | |
|---|---|---|
| 343-49927 | 10/1995 | (JP) . |
| PCT/US92/16978 | 10/1992 | (WO) . |
| PCT/US98/20569 | 5/1998 | (WO) . |

* cited by examiner

Primary Examiner—Stephen Kalafut
Assistant Examiner—Tracy Dove
(74) Attorney, Agent, or Firm—Robert W. Welsh; Stewart A. Fraser

(57) ABSTRACT

An electrode is disclosed that includes at least one ribbon of electrochemically active material. By forming a negative electrode of zinc ribbons, the high-rate discharge capacity of the negative electrode is significantly increased. Consequently, the high-rate service of an electrochemical cell having the inventive electrode structure is improved.

13 Claims, 2 Drawing Sheets

ELECTRODE FOR AN ELECTROCHEMICAL CELL INCLUDING RIBBONS

BACKGROUND OF THE INVENTION

The present invention generally relates to an electrochemical cell. More particularly, the present invention relates to an improved electrode for an electrochemical cell, particularly an alkaline cell.

Typical alkaline electrochemical cells include a positive electrode made of manganese dioxide ($MnO_2$), a negative electrode made of zinc, and an alkaline electrolyte made of potassium hydroxide (KOH), or the like. The positive electrode is normally formed as a hollow cylinder with its outer surface contacting the inner surface of a cell housing, which is shaped as a can. A separator is disposed within the inside of the positive electrode to physically separate the positive electrode from the negative electrode while allowing ionic transport between the two electrodes.

The negative electrode is formed by mixing the zinc active material in the form of a zinc alloy powder with the alkaline electrolyte and a gelling agent. The mix is dispensed within the hollow middle area defined by the inner surface of the separator within the positive electrode. Subsequently, a collector assembly is inserted into the open end of the cell housing, with a collector nail extending down within the negative electrode/electrolyte gel. An outer cover is then placed over the collector assembly, and the cell housing walls are then crimped over the outer cover to seal the cell.

Japanese published Application No. 7-254406 discloses the use of a gelled zinc negative electrode in which a gelling agent and alkaline electrolyte are mixed, and the negative electrode active material comprises non-amalgamated zinc powder in the shape of spheres and elongated elements to increase the surface area exposed to alkali electrolyte. The elongated powder, however, is relatively short in comparison to the dimensions of the negative electrode.

In the manufacture and use of these known batteries or cells, the lowest zinc volume percent in the negative electrode that manufacturers utilize is about no less than 28 percent in the negative electrode gel in order to both match the positive electrode's rate of electrochemical output and provide sufficient particle-to-particle and particle-to-collector contact to maintain the negative electrode's electrical conductance. Below this amount, voltage instability occurs as well as the resulting production of a cell structure having high sensitivity to shock and vibration, which causes the zinc particles to migrate away from the current collector nail thereby decreasing cell efficiency.

In order to provide the maximum electrochemical activity and a minimum of limiting polarization, it is desirable to operate a battery at as low a current density as possible while still producing the required amount of total current from the system. Accordingly, alkaline batteries conventionally employ electrodes made from powdered active materials to obtain the highest possible surface area per unit weight or volume, and thus minimize the current density.

Conventional zinc powder is powder that has been produced by air-jet atomization of molten zinc. It consists of irregularly shaped particles, ranging from lumpy or distorted spheroids to elongated, tuberous forms. In typical battery grade zinc powder, the full population of material consists of many individual particles of a wide range of sizes and shapes. The median value of the particle size for negative electrodes, as determined by sieving, is approximately 100 to 300 microns. The extremes of particle sizes range from 20 to 1000 microns.

U.S. Pat. No. 3,853,625 discloses a gel-free negative electrode made of zinc fibers and needles. The zinc fibers and needles are disclosed as having a 0.006-inch diameter and lengths between one eighth of an inch and four inches. The fibers and needles are disclosed as being formed as a self-supporting mat with the zinc uniformly distributed throughout the negative electrode.

While zinc powder negative electrodes are relatively efficient at low discharge rates, such electrodes are much less efficient when discharged at high rates. Given that most new battery-powdered devices have high current demands, causing the batteries to discharge at high rates, there exists a strong demand for batteries having greater high-rate performance.

In International PCT Patent Publication No. WO 98/20569, entitled "ZINC ANODE FOR AN ELECTROCHEMICAL CELL," by Lewis F. Urry, published on May 14, 1998, a negative electrode is disclosed that includes zinc flakes. The zinc flakes differ from the prior zinc powder particles in that the zinc flakes have a thickness many times smaller than both their length and width, for example, 10 to 20 times smaller. The disclosed flakes have a thickness on the order of 0.001 inch and lengths and widths of 0.024 to 0.04 inch. While the use of zinc flakes improves the high-rate performance of the negative electrode of an alkaline electrochemical cell, there remains room for further improving negative electrode performance, particularly at high drain rates.

It has been discovered that discharge of zinc in an alkaline cell starts near the positive electrode and then proceeds away from the positive electrode. Because the reaction product (e.g., zinc oxide and zinc hydroxide) resulting from the discharge of zinc is more voluminous than the zinc itself, a reaction product skin tends to form between the positive and negative electrodes if there is not enough space to accommodate the reaction product. While such a skin still allows some electrolyte to pass through, the reacting zinc behind the skin does not receive hydroxyl ions from where they are formed in the positive electrode fast enough to offset those consumed by the reacting zinc. Consequently, polarization occurs leading to premature cell failure.

In most cell designs, the current collector, which is often in the form of a nail, is located in the center of the negative electrode. Because most of the zinc discharge occurs at the outer periphery of the negative electrode near the positive electrode interface, it is necessary to maintain a continuous path of connected zinc from the reacting site to the collector nail to facilitate electron transfer. When zinc powders or flakes are used, many particles must touch to form an electron conduction path back to the collector nail. However, because the zinc powder or flakes only constitute approximately 30 percent of the negative electrode volume, any physical shocks to the cell may cause the particles to shift and lose contact. Thus, excess zinc is often added to the negative electrode only to serve as an electron conductor. The excess zinc, however, is not discharged during the life of the cell and takes up valuable space within the cell that could otherwise be used for extra electrolyte to fuel reactions or to hold discharge reaction product while still leaving space for ion transfer. Alternatively, some of the space could be used to increase the amount of $MnO_2$ in the positive electrode.

The above-noted problem of maintaining an electron conduction path is further exasperated as the cell discharges and zinc is consumed in the redox reaction. Although zinc fibers or needles generally provide for a better conduction path than zinc flakes or zinc powder, the fibers and needles are too thin to maintain their physical structure throughout discharge, and hence, electron conductivity is not readily maintained. The lack of a gelling agent in such an electrode structure allows the zinc structure to fall apart and move within the negative electrode volume. Such movement does not provide for efficient distribution and discharge near the end of the battery's useful life.

SUMMARY OF THE INVENTION

Accordingly, it is an aspect of the present invention to solve the above problems by providing a zinc negative electrode for an alkaline cell having improved performance. More specifically, it is an aspect of the present invention to provide a zinc negative electrode having significantly increased discharge capacity at high discharge rates. Correspondingly, it is also an aspect of the present invention to provide an alkaline electrochemical cell including the improved zinc negative electrode.

To achieve these and other aspects and advantages, the electrochemical cell of the present invention comprises a cell housing having an interior surface; a first electrode disposed adjacent the interior surface of the cell housing, the first electrode defining a cavity; a second electrode disposed within the cavity; and an electrolyte disposed in the cell housing, wherein at least one of the electrodes includes at least one ribbon.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
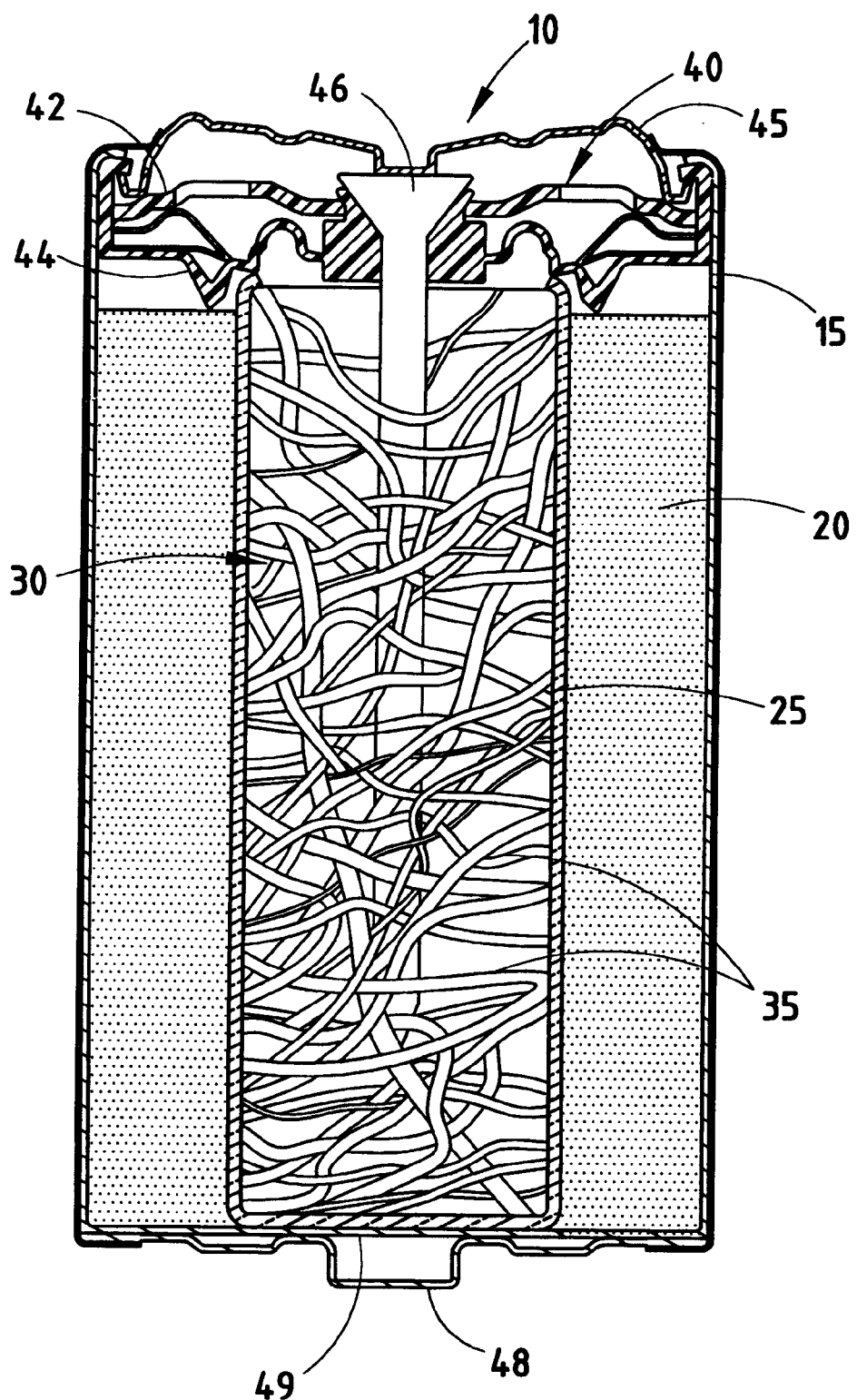
FIG. 1 is a cut-away schematic of an electrochemical cell constructed in accordance with a first embodiment of the present invention.

FIG. 1 shows an electrochemical cell 10 constructed in accordance with the present invention. As shown, cell 10 includes a cylindrical cell housing 15 in which a positive electrode 20 is located adjacent the inner sidewalls of cell housing 15. Positive electrode 20 is shaped as a hollow cylinder that may be impact molded inside of housing 15 or inserted as a plurality of rings after molding. In a typical alkaline cell, positive electrode 20 is made primarily of $MnO_2$. Cell 10 further includes a separator 25 that lines the inner walls of the hollow cavity within positive electrode 20. As described in further detail below, a negative electrode 30 is deposited within the separator-lined hollow cavity of positive electrode 20. An alkaline electrolyte, such as KOH, is also dispensed within the lined hollow cavity of positive electrode 20.

The cell is closed and sealed by a collector assembly 40 and an outer terminal cover 45. In general, collector assembly 40 includes an inner cover 42, a seal 44, and a current collector 46. As known in the art, collector assembly 40 and outer terminal cover 45 are electrically coupled to negative electrode 30 and are insulated from the remainder of cell housing 15. In this manner, outer terminal cover 45 may serve as a negative contact terminal for cell 10. A second outer terminal cover 48 may be secured to a closed end 49 of the electrically conductive cell housing 15 to serve as a positive terminal for cell 10.

As shown in FIG. 1, negative electrode 30 includes a plurality of ribbons 35 of electrochemically active material. As used and described herein, a "ribbon" is an elongated flexible element with a width substantially greater than its thickness and a length substantially greater than its width. Preferably, such a ribbon has a width that is at least three times its thickness and a length at least three times its width. For an alkaline cell, ribbons 35 are made of zinc, and are preferably made of a zinc alloy including one or more of the metals selected from the group consisting of bismuth, indium, calcium, and aluminum. Ribbons 35 preferably have a length that exceeds the radial distance between current collector 46 and the inner surface of separator 25. More preferably, the ribbons have lengths that are at least about 10 times the radial distance between current collector 46 and the inner surface of separator 25 to ensure that the ribbons will extend near the separator interface and still physically contact current collector 46. Thus, the length of the ribbons is preferably at least 2 mm and is more preferably at least 2 cm. It will be appreciated, however, that the length of the ribbons is not critical and the length of each of the ribbons may vary.

By physically contacting current collector 46, the zinc ribbons maintain a direct electrical connection. Moreover, the zinc ribbons provide a conduction path that is stable and not subject to physical shock. In addition, by using the negative electrode construction of the present invention, the electrolyte is wicked towards the center of the negative electrode and reaction product is allowed to move, thereby avoiding the formation of an undesirable skin at the negative-positive electrode interface. The solid zinc ribbons also eliminate problems associated with zinc particles migrating through the separator or otherwise becoming located on the wrong side of the separator and in contact with the positive electrode.

Although a plurality of such ribbons is illustrated, it will be appreciated that an extra long single ribbon may be used. The length and number of the ribbons is only limited by the weight of zinc to be added. Also, if more than one ribbon is used, the dimensions of each ribbon may vary.

The zinc ribbons may be formed by rapid solidification of molten zinc alloy. Such zinc ribbon is now available from Transmet of Columbus, Ohio. By making the ribbons between about 2 and 80 m thick, and more preferably approximately 20–25 μm thick, the ribbons will not disintegrate before the cell fully discharges, but instead will retain their ribbon-like form, and importantly, the ribbons maintain an excellent conductive path to current collector 46. The width of the electrode is selected to maintain electrical continuity throughout the useful life of the battery to provide sufficient structural integrity so that the ribbon is self-supporting, and to allow ease of dispensing the ribbon in the cavity of the positive electrode. The width of the ribbons is preferably between about 40 and 3200 μm, and is more preferably about 500 μm.

Given the self-supporting nature of the negative electrode construction, use of a gelling agent in the electrolyte may be avoided since it is not needed to support the zinc. Thus, the distribution of the zinc throughout the negative electrode may be maintained. Because such a gel-free electrolyte is much less viscous, it is more easily dispensed in the cell and air is less likely to become trapped within the negative electrode during manufacture. If desired, gelled electrolyte could nevertheless be subsequently added.

Figure 2:
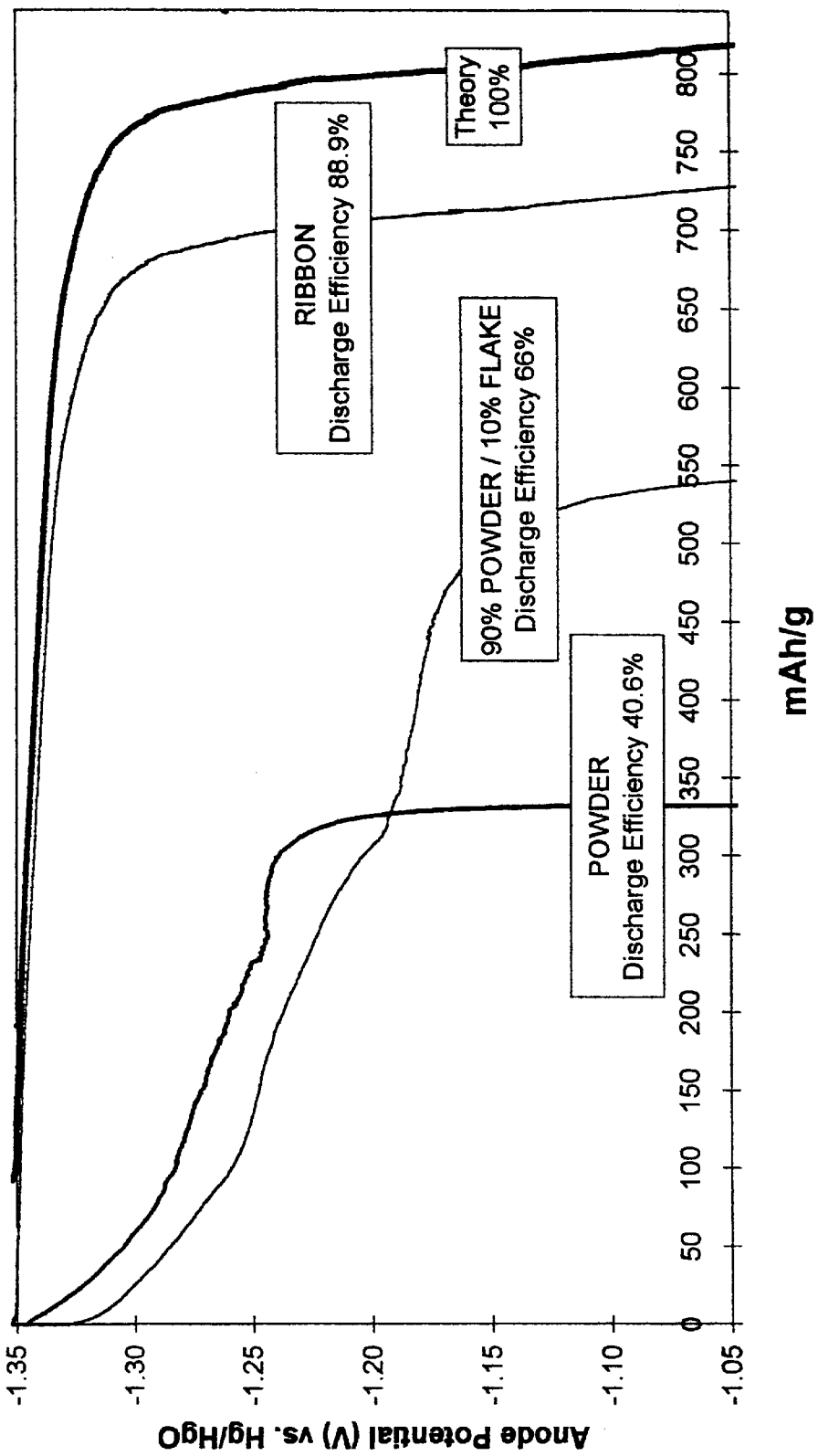
FIG. 2 is a line graph showing comparative discharge efficiencies for conventional negative electrodes and negative electrodes constructed in accordance with the present invention.

By maximizing the zinc surface area and by maintaining an excellent conductive path between the zinc ribbons and current collector 46, the high-rate discharge capacity of the negative electrode remarkably improves. As shown in FIG. 2, the theoretical discharge capacity of zinc is 820 mAh/g. The discharge capacity of a half-cell including a negative electrode constructed in accordance with the present invention was found to be approximately 730 mAh/g at a high-rate discharge current of 250 mA per gram of zinc, representing a discharge efficiency of 88.9 percent of the theoretical discharge capacity. The high-rate discharge capacity for a half-cell including a conventional zinc negative electrode formed by mixing zinc powder with electrolyte and a gelling agent is 336 mAh/g when discharged at 250 mA per gram of zinc, representing a discharge efficiency of 41 percent of the theoretical discharge capacity for zinc. A negative electrode formed using 90 percent zinc powder and 10 percent zinc flakes as taught in International PCT Patent Publication No. WO 98/20569 has a discharge capacity of 541 mAh/g at a discharge rate of 250 mA per gram of zinc, representing a discharge efficiency of 66 percent.

The half-cell used to characterize the discharge characteristics of the zinc ribbon is a three-electrode electrochemical system consisting of a working electrode, a cylindrical nickel-mesh counter electrode, and a commercial Hg/HgO reference electrode. The working electrode is a cylindrical nylon-mesh basket filled with anode material, either gelled zinc powder or flakes or zinc ribbon in contact with a brass nail current collector. The half-cell is flooded with electrolyte of a composition of 37 percent KOH/3 percent ZnO. The discharge is conducted at ambient temperature. The constant current is delivered by a Solartron Electrochemical Interface, and the electrode potentials are monitored by a data logger.

The increased discharge efficiency of the zinc negative electrode of the present invention results in an electrochemical cell having significantly improved high-rate service, which is becoming increasingly important as more and more battery-powered devices are designed that draw current at increasingly higher rates.

The zinc ribbons used in the present invention have excellent wetting capability and enable the replacement of electrolyte hydroxyl ions at the surface of the zinc negative electrode by actually drawing electrolyte absorbed in the positive electrode back through the separator to the negative electrode where the electrolyte is needed using a capillary-like action.

While the present invention has been described as a negative electrode, it is possible that the electrode having the inventive ribbon(s) could be the positive electrode. Additionally, although the present invention is described as a primary alkaline cell, the inventive electrode structure could be utilized in other primary cell chemistries, such as carbon-zinc or lithium cells, or in rechargeable cells, such as nickel cadmium, nickel metal hydride, or lithium-ion cells. Thus, the ribbons could be made of any of the electrochemically active materials used for the positive or negative electrodes in such cells. For example, the ribbons could be made of a compound including at least one material selected from the group consisting of cadmium, nickel, metal hydride, lithium, cobalt, $MnO_2$, zinc, and carbon.

Although the present invention has been shown and described with reference to cylindrical cells, it will be appreciated by those skilled in the art that the zinc negative electrode of the present invention may be employed in other electrochemical cells, such as prismatic cells. Additionally, the negative electrode of the present invention may be used in cells having essentially any cell construction.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. An electrochemical cell comprising a cell housing having an interior surface; a first electrode disposed adjacent the interior surface of said cell housing, said first electrode defining a cavity; a second electrode disposed within said cavity; and an electrolyte disposed in said cell housing, wherein at least one of said electrodes includes at least one ribbon of an electrochemically active material and wherein said ribbon has a length of at least about 2 mm.

2. The electrochemical cell as defined in claim 1 and further including a separator disposed between said first and second electrodes and a current collector extending centrally within said cell housing, wherein said ribbon has a length equal to at least the distance between said separator and said current collector.

3. The electrochemical cell as defined in claim 2, wherein said ribbon has a length of at least about 10 times the distance between said separator and said current collector.

4. The electrochemical cell as defined in claim 1, wherein said ribbon has a width between about 40 and 3200 $\mu$m.

5. The electrochemical cell as defined in claim 5, wherein said ribbon has a thickness of between about 2 and 80 $\mu$m.

6. The electrochemical cell as defined in claim 4, wherein said ribbon has a thickness of between about 2 and 80 $\mu$m.

7. The electrochemical cell as defined in claim 1, wherein said ribbon has a width between about 40 and 3200 $\mu$m.

8. The electrochemical cell as defined in claim 7, wherein said ribbon has a thickness of between about 2 and 80 $\mu$m.

9. The electrochemical cell as defined in claim 1, wherein said ribbon has a thickness of between about 2 and 80 $\mu$m.

10. The electrochemical cell as defined in claim 1, wherein said ribbon is made of a zinc alloy, including at least one of the metals selected from the group consisting of bismuth, indium, calcium, and aluminum.

11. The electrochemical cell as defined in claim 1, wherein said electrolyte is an alkaline electrolyte.

12. The electrochemical cell as defined in claim 1, wherein said first electrode includes $MnO_2$.

13. The electrochemical cell as defined in claim 1, wherein said first electrode is a positive electrode and said second electrode is a negative electrode.

* * * * *